No. 727,295. PATENTED MAY 5, 1903.
R. M. CONNABLE.
TIRE FASTENER.
APPLICATION FILED FEB. 4, 1903.
NO MODEL.
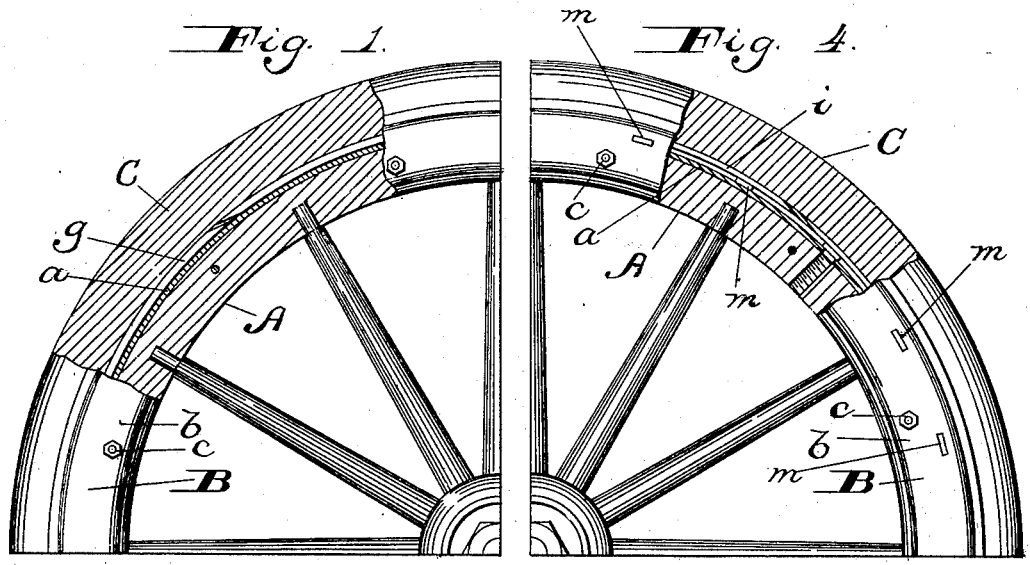
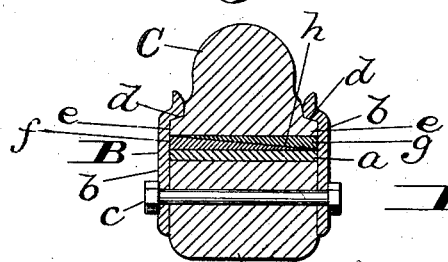
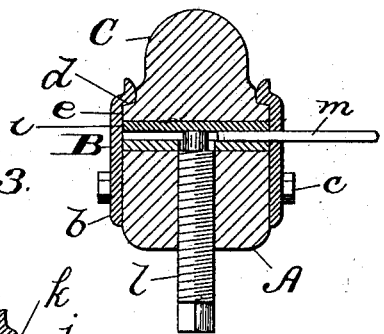
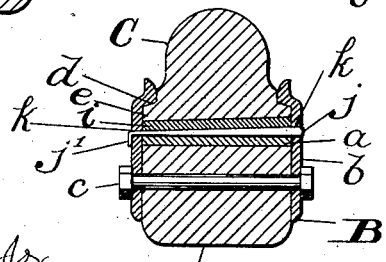
Witnesses.
H. F. Meyer Jr
G. F. Vogt.
Inventor.
Ralph M. Connable
By Mann & Co.
Attorneys.

No. 727,295. Patented May 5, 1903.

UNITED STATES PATENT OFFICE.

RALPH M. CONNABLE, OF BALTIMORE, MARYLAND.

TIRE-FASTENER.

SPECIFICATION forming part of Letters Patent No. 727,295, dated May 5, 1903.

Application filed February 4, 1903. Serial No. 141,837. (No model.)

*To all whom it may concern:*

Be it known that I, RALPH M. CONNABLE, a citizen of the United States, residing at Baltimore, State of Maryland, have invented certain new and useful Improvements in Tire-Fasteners, of which the following is a specification.

This invention relates to elastic tires for vehicle-wheels, and especially to that class of tires in which the rubber or rubber-composition portion of the tire is retained on the rim of the wheel either by means of a tie-band or tie-wires embedded in the tire or engaging side flanges of the tire or by shoulders extending inwardly from annular side plates secured to the felly of the wheel.

The object of the invention is to provide for a tire of this character a novel construction of fastening which will act to press the tire outwardly against its retaining means.

The invention consists in certain constructions and arrangement of parts, hereinafter fully described and claimed, reference being had to the accompanying drawings, in which—

Figure 1 is a side view, partly in section, of a portion of a vehicle-wheel provided with the tire-fastening of this invention. Fig. 2 is a transverse section thereof. Fig. 3 is a similar view illustrating a modified form of fastening. Fig. 4 is a view similar to Fig. 1 and illustrating another form of the invention. Fig. 5 is a cross-sectional view illustrating the construction shown in Fig. 4.

Referring to the drawings, Figs. 1 and 2, the letter A designates the felly of a vehicle-wheel. B designates a channeled rim consisting in this instance of a metal tire $a$, forming the bottom of the channel, and two annular side plates $b$, secured by bolts $c$ to the felly at opposite sides of the metal tire and said side plates provided on their opposing faces with inwardly-extending retaining-shoulders $d$, and C designates the elastic tire seated in said channeled rim and retained therein by the shoulders $d$, which take over an enlargement or side flanges $e$ at the base of the tire, as illustrated in Fig. 2.

Interposed between the base of the elastic tire C and the metal tire $a$ is means for holding the tire in an outwardly-compressed condition against its retaining means, in this instance the shoulders $d$. Said holding means, in the form illustrated in Figs. 1 and 2, comprises two liners $f$ $g$, each in the present instance in the form of a transversely-split band with their contacting faces transversely inclined or beveled, as indicated at $h$, so as to produce a wedge formation. To apply this form of tire to the wheel, the metal tire $a$ having of course been previously "upset" or shrunk in place on the felly, the two band-liners $f g$ are first inserted one upon the other on the said metal tire $a$, the said side plates $b$ are applied to the felly, but are left loose enough to allow for the insertion between them of the elastic tire C, and the latter is then inserted between said side plates, whereupon said side plates are drawn together securely by the bolts $c$, and this movement of said side plates will cause the band-liners to move inwardly one upon the other, their inclined faces causing the one to ride up on the other, and thereby compressing the tire C outwardly against its retaining means and holding it in its outwardly-compressed condition securely on the wheel.

In the construction illustrated in Fig. 3 instead of the two band-liners $f g$ I employ a band $i$ at the base of the elastic tire, and between said band and the metal tire $a$ is any desired number of wedge-shaped liners $j$, which are inserted in a sidewise direction through holes $k$ in the side plates in order to compress the elastic tire outwardly against the retaining means and are secured in place by any desired means—for instance, by mashing down the smaller end of the wedge, as illustrated at $j'$, Fig. 3.

In the construction illustrated in Figs. 4 and 5 the elastic tire C is first compressed outwardly against its retaining means by screw-threaded bolts $l$, working through the felly A and the metal tire $a$ against the band $i$ at the base of the elastic tire C, and after the said tire has been thus compressed any desired number of liners M are partly inserted in a sidewise direction through one of the side plates $b$ and between the band $i$ and the metal tire $a$ to hold the elastic tire in the proper outwardly-compressed condition. The bolts $l$ may be then withdrawn, as illustrated in Fig. 4, and the said liners $m$ are driven "home."

The liners *m* of course need not be wedge shape like the liners *j*. (Illustrated in Fig. 3.)

It is obvious that various changes may be made in the details of construction without departing from the scope of the invention as defined in the appended claims.

Having thus described my invention, what I claim as new, and desire to secure by Letters Patent, is—

1. In a vehicle-wheel, the combination with an elastic tire and retaining means for the tire, of liners inserted between the wheel-rim and the elastic tire and adapted to hold the latter in an outwardly-compressed condition against the retaining means.

2. In a vehicle-wheel, the combination with an elastic tire and retaining means for the tire, of wedge shape or inclined liners adapted to press the tire outwardly against its retaining means.

In testimony whereof I affix my signature in the presence of two witnesses.

RALPH M. CONNABLE.

Witnesses:
G. FENDINAND VOGT,
FREDERICK S. STITT.